United States Patent
Segev et al.

(10) Patent No.: US 9,723,439 B2
(45) Date of Patent: Aug. 1, 2017

(54) APPARATUS, SYSTEM AND METHOD OF NEIGHBOR AWARENESS NETWORKING (NAN) GEO-FENCING

(71) Applicant: INTEL IP CORPORATION, Santa Clara, CA (US)

(72) Inventors: Jonathan Segev, Tel Mond (IL); Emily H. Qi, Camas, WA (US)

(73) Assignee: INTEL IP CORPORATION, Santa Clara, CA (US)

( * ) Notice: Subject to any disclaimer, the term of this patent is extended or adjusted under 35 U.S.C. 154(b) by 93 days.

(21) Appl. No.: 14/748,286

(22) Filed: Jun. 24, 2015

(65) Prior Publication Data

US 2016/0219401 A1    Jul. 28, 2016

Related U.S. Application Data

(60) Provisional application No. 62/107,548, filed on Jan. 26, 2015.

(51) Int. Cl.

| | | |
|---|---|---|
| *H04W 24/00* | (2009.01) | |
| *H04W 4/02* | (2009.01) | |
| *H04W 84/12* | (2009.01) | |
| *H04W 4/08* | (2009.01) | |
| *H04W 24/10* | (2009.01) | |
| *H04W 8/00* | (2009.01) | |
| *H04W 8/02* | (2009.01) | |

(52) U.S. Cl.
CPC ............. *H04W 4/021* (2013.01); *H04W 4/08* (2013.01); *H04W 8/005* (2013.01); *H04W 8/02* (2013.01); *H04W 24/10* (2013.01); *H04W 84/12* (2013.01)

(58) Field of Classification Search
CPC ....... H04W 4/021; H04W 8/005; H04W 8/20; H04W 4/08; H04W 24/10; H04W 84/12
See application file for complete search history.

(56) References Cited

U.S. PATENT DOCUMENTS

| | | | |
|---|---|---|---|
| 2014/0059695 A1* | 2/2014 | Parecki | G06F 21/60 726/26 |
| 2014/0355462 A1* | 12/2014 | Aldana | G01S 5/00 370/252 |
| 2015/0023502 A1* | 1/2015 | Li | H04W 4/021 380/270 |

(Continued)

OTHER PUBLICATIONS

IEEE Std 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

(Continued)

*Primary Examiner* — Barry Taylor
(74) *Attorney, Agent, or Firm* — Shichrur & Co.

(57) ABSTRACT

Some demonstrative embodiments include apparatuses, systems and/or methods of Neighbor Awareness Networking (NAN) Geo-Fencing. For example, an apparatus may include circuitry configured to cause a Neighbor Awareness Networking (NAN) device to process a plurality of geo-fencing parameters of a geofence from an application on the NAN device; and perform geo-fencing with another NAN device based on the geo-fencing parameters.

21 Claims, 5 Drawing Sheets

(56) References Cited

U.S. PATENT DOCUMENTS

2015/0098460 A1* 4/2015 Wang .................. H04W 4/08
370/338
2016/0183113 A1* 6/2016 Dua ................ H04W 72/1278
370/329
2016/0330701 A1* 11/2016 Kim .................... H04W 56/001

OTHER PUBLICATIONS

Wi-Fi Alliance, Wi-Fi Peer-to-Peer (P2P) Technical Specification Version 1.5, Aug. 4, 2014, 183 pages.
Wi-Fi Alliance, Wi-Fi Neighbor Awareness Networking (NAN) Technical Specification Version 1.0, May 1, 2015, 98 pages.

* cited by examiner

APPARATUS, SYSTEM AND METHOD OF NEIGHBOR AWARENESS NETWORKING (NAN) GEO-FENCING

CROSS REFERENCE

This application claims the benefit of and priority from U.S. Provisional Patent Application No. 62/107,548 entitled "Apparatus, System and Method of Geo-Fencing in Awareness Networking", filed Jan. 26, 2015, the entire disclosure of which is incorporated herein by reference.

TECHNICAL FIELD

Embodiments described herein generally relate to Neighbor Awareness Networking (NAN) geo-fencing.

BACKGROUND

Various applications use range information between devices.

The range information may enable, for example, users of the devices to meet new people and/or to use one or more services provided by the devices, e.g., when the devices are in proximity to each other. In one example, a Smartphone may "unlock" a notebook, for example, if the Smartphone is within a predefined distance, e.g., less than one meter, from the notebook. In another example, an alarm may be triggered, for example, if the distance between the Smartphone and the notebook is greater than a predefined distance.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
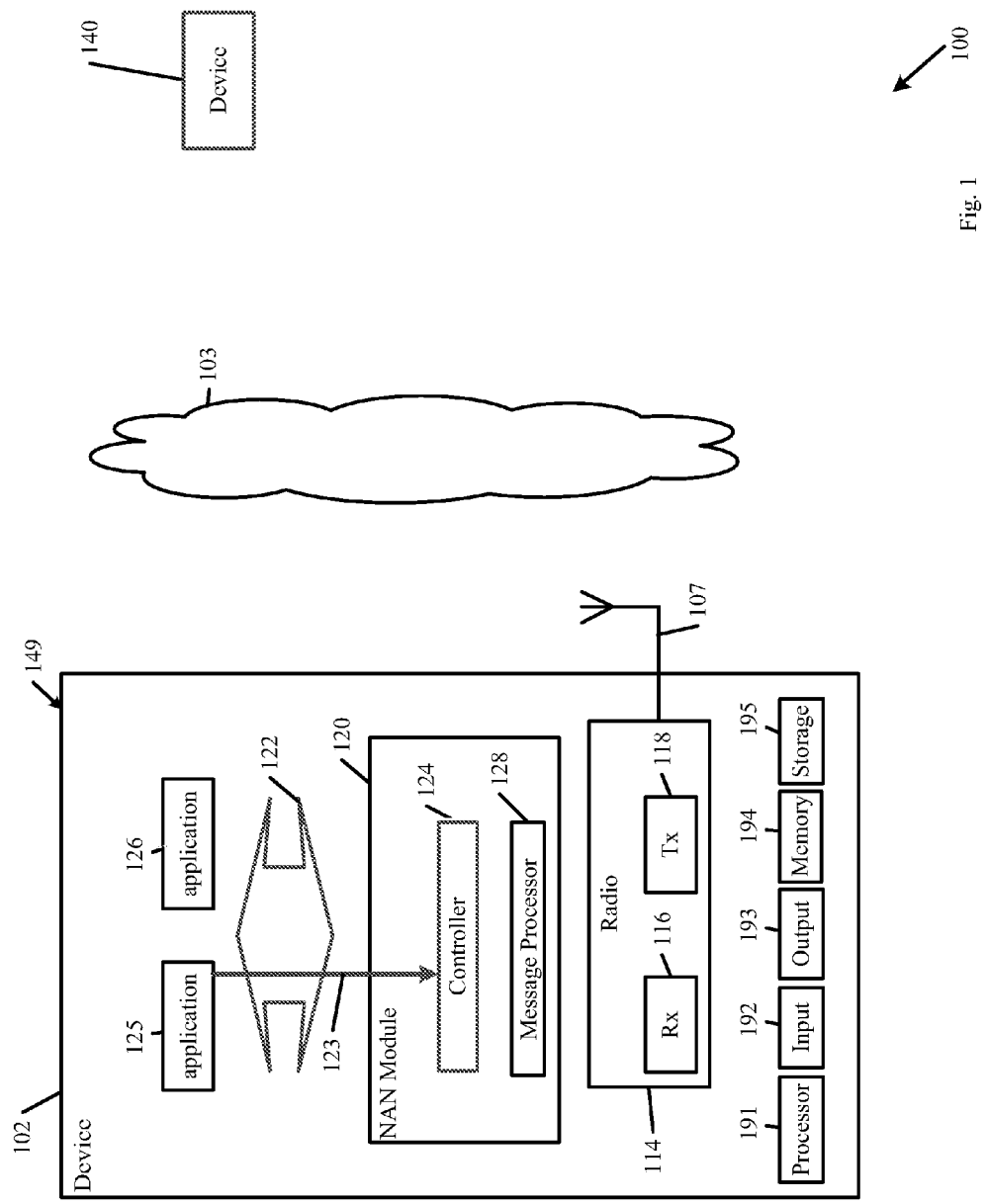
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with devices and/or networks operating in accordance with existing Wi-Fi Alliance (WFA) Specifications (including *Wi-Fi Neighbor Awareness Networking (NAN) Technical Specification, Version* 1.0, *May* 1, 2015) and/or future versions and/or derivatives thereof, devices and/or networks operating in accordance with existing WFA Peer-to-Peer (P2P) specifications (*Wi-Fi P2P technical specification, version* 1.5, *Aug.* 4, 2014) and/or future versions and/or derivatives thereof, devices and/or networks operating in accordance with existing Wireless-Gigabit-Alliance (WGA) specifications (*Wireless Gigabit Alliance, Inc WiGig MAC and PHY Specification Version* 1.1, *April* 2011, *Final specification*) and/or future versions and/or derivatives thereof, devices and/or networks operating in accordance with existing IEEE 802.11 standards (*IEEE 802.11-2012, IEEE Standard for Information technology—Telecommunications and information exchange between systems Local and metropolitan area networks—Specific requirements Part* 11: *Wireless IAN Medium Access Control (MAC) and Physical Layer (PHY) Specifications, Mar.* 29, 2012; *IEEE*802.11*ac*-2013 ("*IEEE* P802.11*ac*-2013, *IEEE Standard for Information Technology—Telecommunications and Information Exchange Between Systems—Local and Metropolitan Area Networks—Specific Requirements—Part* 11: *Wireless LAN Medium Access Control (MAC) and Physical Layer (PHY) Specifications—Amendment* 4: *Enhancements for Very High Throughput for Operation in Bands below* 6 *GHz*", *December,* 2013); *IEEE* 802.11*ad* ("*IEEE P*802.11*ad*-2012, *IEEE Standard for Information Technology—Telecommunications and Information Exchange Between Systems—Local and Metropolitan Area Networks—Specific Requirements—Part* 11: *Wireless LAN Medium Access Control (MAC) and Physical Layer (PHY) Specifications—Amendment* 3: *Enhancements for Very High Throughput in the* 60 *GHz Band*", 28 *Dec.* 2012); and/or IEEE-802.11REVmc ("*IEEE* 802.11-*REVmc*™/*D*3.0, *June* 2014 *draft standard for Information technology—Telecommunications and information exchange between systems Local and metropolitan area networks Specific requirements; Part* 11: *Wireless LAN*

Medium Access Control (*MAC*) *and Physical Layer* (*PHY*) *Specification*")) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, an Internet of things (IoT) device, a sensor device, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN, e.g., a Wi-Fi network. Other embodiments may be used in conjunction with any other suitable wireless communication network, for example, a wireless area network, a "piconet", a WPAN, a WVAN and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/ receive elements. The antenna may include, for example, a phased array antenna, a single element antenna, a set of switched beam antennas, and/or the like.

Some demonstrative embodiments are described herein with respect to Wi-Fi communication. However, other embodiments may be implemented with respect to any other communication scheme, network, standard and/or protocol.

The phrase "peer to peer (PTP) communication", as used herein, may relate to device-to-device communication over a wireless link ("peer-to-peer link") between devices. The PTP communication may include, for example, a Wi-Fi Direct (WFD) communication, e.g., a WFD Peer to Peer (P2P) communication, wireless communication over a direct link within a QoS basic service set (BSS), a tunneled direct-link setup (TDLS) link, a STA-to-STA communication in an independent basic service set (IBSS), or the like.

Reference is now made to FIG. 1, which schematically illustrates a block diagram of a system 100, in accordance with some demonstrative embodiments.

As shown in FIG. 1, in some demonstrative embodiments system 100 may include a wireless communication network including one or more wireless communication devices, e.g., wireless communication devices 102 and/or 140.

In some demonstrative embodiments, wireless communication device 102 and/or device 140 may include, for example, a UE, an MD, a STA, an AP, a PC, a desktop computer, a mobile computer, a laptop computer, an Ultrabook™ computer, a notebook computer, a tablet computer, a server computer, a handheld computer, a handheld device, an Internet of Things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 and/or device 140 may include, or may perform the functionality of an Access Point (AP) STA.

In some demonstrative embodiments, device 102 and/or device 140 may include, or may perform the functionality of, a non-AP STA.

In one example, both of devices 102 and 140 may include, or may perform the functionality of, a non-AP STA.

In another example, one of devices 102 and 140 may include, or may perform the functionality of, an AP STA, and another one of devices 102 and 140 may include, or may perform the functionality of, a non-AP STA. For example, device 102 may perform the functionality of an AP, and device 140 may perform the functionality of a non-AP STA. In another example, device 140 may perform the functionality of an AP STA, and device 102 may perform the functionality of a non-AP STA.

In yet another example, both of devices 102 and 140 may include, or may perform the functionality of, an AP STA.

In some demonstrative embodiments, an AP may include, or may perform the functionality of, for example, a router, a PC, a server, a Hot-Spot and/or the like.

In some demonstrative embodiments, the non-AP may include, for example, a Smartphone, a tablet, a notebook, a sensor device, a UE, a mobile device, an IoT device, and/or the like.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a non-access-point (non-AP) station (STA) may include a STA that is not contained within an AP. The non-AP STA may perform any other additional or alternative functionality.

In some demonstrative embodiments, device 102 and/or device 140 may include, for example, one or more of a processor 191, an input unit 192, an output unit 193, a memory unit 194, and/or a storage unit 195. Device 102 and/or device 140 may optionally include other suitable hardware components and/or software components. In some demonstrative embodiments, some or all of the components of device 102 and/or device 140 may be enclosed in a common housing or packaging, and may be interconnected or operably associated using one or more wired or wireless links. In other embodiments, components of devices 102 and/or 140 may be distributed among multiple or separate devices.

In some demonstrative embodiments, processor 191 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications.

In some demonstrative embodiments, input unit 192 may include, for example, a keyboard, a keypad, a mouse, a touch-screen, a touch-pad, a track-ball, a stylus, a microphone, or other suitable pointing device or input device. Output unit 193 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 may include, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102.

In some demonstrative embodiments, wireless communication devices 102 and/or 140 may be capable of communicating content, data, information and/or signals via a wireless medium (WM) 103. In some demonstrative embodiments, wireless medium 103 may include, for example, a radio channel, a cellular channel, a Global Navigation Satellite System (GNSS) Channel, an RF channel, a Wi-Fi channel, an IR channel, a Bluetooth (BT) channel, and the like.

In some demonstrative embodiments, wireless communication medium 103 may include a wireless communication channel over a 2.4 Gigahertz (GHz) frequency band, a 5 GHz frequency band, a millimeterWave (mmWave) frequency band, e.g., a 60 GHz frequency band, a Sub 1 Gigahertz (S1G) band, and/or any other frequency band.

In some demonstrative embodiments, device 102 and/or device 140 may include one or more radios including circuitry and/or logic to perform wireless communication between devices 102, 140 and/or one or more other wireless communication devices. For example, device 102 and/or device 140 may include a radio 114.

In some demonstrative embodiments, radio 114 may include one or more wireless receivers (Rx) including circuitry and/or logic to receive wireless communication signals, RF signals, frames, blocks, transmission streams, packets, messages, data items, and/or data. For example, radio 114 may include a receiver 116.

In some demonstrative embodiments, radio 114 may include one or more wireless transmitters (Tx) including circuitry and/or logic to send wireless communication signals, RF signals, frames, blocks, transmission streams, packets, messages, data items, and/or data. For example, radio 114 may include a transmitter 118.

In some demonstrative embodiments, radio 114 may be configured to communicate over a 2.4 GHz band, a 5 GHz band, a mmWave band, a S1G band, and/or any other band.

In some demonstrative embodiments, radio 114 may include circuitry and/or logic, modulation elements, demodulation elements, amplifiers, analog to digital and digital to analog converters, filters, and/or the like. In one example, radio 114 may include or may be implemented as part of a wireless Network Interface Card (NIC), and the like.

In some demonstrative embodiments, radio 114 may include, or may be associated with, one or more antennas 107.

In one example, device 102 may include a single antenna 107. In other example, device 102 may include two or more antennas 107.

Antennas 107 may include any type of antennas suitable to transmit and/or receive wireless communication signals, blocks, frames, transmission streams, packets, messages and/or data. For example, antennas 107 may include any suitable configuration, structure and/or arrangement of one or more antenna elements, components, units, assemblies and/or arrays. Antennas 107 may include, for example, antennas suitable for directional communication, e.g., using beamforming techniques. For example, antennas 107 may include a phased array antenna, a multiple element antenna, a set of switched beam antennas, and/or the like. In some embodiments, antennas 107 may implement transmit and receive functionalities using separate transmit and receive antenna elements. In some embodiments, antennas 107 may implement transmit and receive functionalities using common and/or integrated transmit/receive elements.

In some demonstrative embodiments, wireless communication device 102 and/or device 140 may form, and/or may communicate as part of, a wireless local area network (WLAN).

In some demonstrative embodiments, wireless communication devices 102 and/or 140 may form, and/or may communicate as part of, a Wi-Fi network.

In some demonstrative embodiments, wireless communication devices 102 and/or 140 may form, and/or may communicate as part of, a Wi-Fi Direct (WFD) network, e.g., a Wi-Fi direct services (WFDS) network, and/or may perform the functionality of one or more WFD devices.

In one example, wireless communication devices 102 and/or 140 may include, or may perform the functionality of a Wi-Fi Direct device.

In some demonstrative embodiments, wireless communication devices 102 and/or 140 may be capable of performing awareness networking communications, for example, according to an awareness protocol, e.g., a Wi-Fi aware protocol, and/or any other protocol, e.g., as described below.

In some demonstrative embodiments, wireless communication devices 102 and/or 140 may be capable of forming, and/or communicating as part of, a Neighbor Awareness Networking (NAN) network, e.g., a Wi-Fi NAN or Wi-Fi Aware network, and/or may perform the functionality of one or more NAN devices ("Wi-Fi aware devices").

In some demonstrative embodiments, wireless communication medium 103 may include a direct link, for example, a PTP link, e.g., a Wi-Fi direct P2P link or any other PTP link, for example, to enable direct communication between device 102 and device 140.

In some demonstrative embodiments, wireless communication devices 102 and/or 140 may perform the functionality of WFD P2P devices. For example, devices 102 and/or 140 may be able to perform the functionality of a P2P client device, and/or P2P group Owner (GO) device.

In other embodiments, wireless communication devices 102 and/or 140 may form, and/or communicate as part of, any other network and/or perform the functionality of any other wireless devices or stations.

In some demonstrative embodiments, device 102 and/or device 140 may include one or more applications configured to provide, share, and/or to use one or more services, e.g., a social application, a file sharing application, a media application and/or the like, for example, using an awareness network, NAN network ("Wi-Fi Aware network"), a PTP network, a P2P network, WFD network, or any other network.

In some demonstrative embodiments, device 102 may execute an application 125 and/or an application 126.

In some demonstrative embodiments, device 102 and/or device 140 may be capable of sharing, showing, sending, transferring, printing, outputting, providing, synchronizing, and/or exchanging content, data, and/or information, e.g., between applications and/or services of device 102 and/or device 140, and/or one or more other devices.

In some demonstrative embodiments, device 102 and/or device 140 may include a NAN module configured to control one or more NAN functionalities of device 102 and/or device 140, for example, one or more functionalities of communication, e.g., awareness networking communications, Wi-Fi Aware (NAN) communication and/or any other communication, between device 102 and/or device 140 and/or other devices, one or more operations, e.g., NAN operations, and/or any other functionality and/or operations, e.g., as described below. For example, device 102 may include a NAN module 120.

In some demonstrative embodiments, device 102 and/or device 140 may include a controller configured to control one or more functionalities of device 102 and/or device 140, for example, one or more functionalities of communication, e.g., awareness networking communications, Wi-Fi Aware (NAN) communication and/or any other communication, between device 102 and/or device 140 and/or other devices, one or more operations, e.g., NAN operations, and/or any other functionality and/or operations, e.g., as described below. For example, NAN module 120 may include a controller 124.

In some demonstrative embodiments, controller 124 may be configured to perform one or more functionalities, communications, operations and/or procedures between wireless communication device 102 and/or device 140, and/or one or more other devices, e.g., as described below.

In some demonstrative embodiments, controller 124 may include circuitry and/or logic, e.g., one or more processors including circuitry and/or logic, memory circuitry and/or logic, and/or any other circuitry and/or logic, configured to perform the functionality of controller 124. Additionally or alternatively, one or more functionalities of controller 124 may be implemented by logic, which may be executed by a machine and/or one or more processors, e.g., as described below.

In one example, controller 124 may include circuitry and/or logic, for example, one or more processors including circuitry and/or logic, to cause a wireless device, e.g., device 102, and/or a wireless station, e.g., a wireless STA implemented by device 102, to perform one or more operations, communications and/or functionalities, e.g., as described herein.

In one example, controller 124 may perform one or more functionalities of a NAN engine, e.g., a NAN discovery engine (DE), for example to process one or more service queries and/or responses, e.g., from applications and/or services on device 102 and/or device 140, and/or one or more other devices.

In some demonstrative embodiments, device 102 and/or device 140 may include one or more interfaces to interface between a controller of device 102 and/or device 140 and one or more applications of device 102 and/or device 140. For example, device 102 may include at least one interface 122 to interface between controller 124 and applications 125 and/or 126.

In one example, interface 122 may include an Application Programming Interface (API), e.g., a NAN API, for example, to receive one or more service queries and/or responses, e.g., from applications 125, 126 and/or from one or more other services and/or applications on device 102.

In some demonstrative embodiments, NAN module 120 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below. In one example, message processor 128 may be configured to process transmission of one or more messages from a wireless station, e.g., a wireless STA implemented by device 102; and/or message processor 128 may be configured to process reception of one or more messages by a wireless station, e.g., a wireless STA implemented by device 102.

In some demonstrative embodiments, message processor 128 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of message processor 128. Additionally or alternatively, one or more functionalities of message processor 128 may be implemented by logic, which may be executed by a machine and/or one or more processors, e.g., as described below.

In one example, message processor 128 may perform one or more functionalities of a NAN MAC configured to generate, process and/or handle one or more NAN messages, e.g., NAN Beacon frames and/or NAN Service Discovery frames.

In some demonstrative embodiments, at least part of the functionality of message processor 128 may be implemented as part of radio 114.

In some demonstrative embodiments, at least part of the functionality of message processor 128 may be implemented as part of controller 124.

In other embodiments, the functionality of message processor 128 may be implemented as part of any other element of device 102.

In some demonstrative embodiments, at least part of the functionality of NAN module 120, controller 124, and/or message processor 128 may be implemented by an integrated circuit, for example, a chip, e.g., a System in Chip (SoC). In one example, the chip or SoC may be configured to perform one or more functionalities of radio 114. For example, the chip or SoC may include one or more elements of NAN module 120, one or more elements of controller 124, one or more elements of message processor 128, and/or one or more elements of radio 114. In one example, NAN module 120, controller 124, message processor 128, and radio 114 may be implemented as part of the chip or SoC.

In some demonstrative embodiments, device 102 and/or device 140 may perform the functionality of a device or station, for example, an awareness networking device, a NAN device, a Wi-Fi device, a Wi-Fi Aware device, a WFD device, a WLAN device and/or any other device, capable of discovering other devices according to a discovery protocol and/or scheme.

In some demonstrative embodiments, radio 114 may communicate over wireless communication medium 103 according to an awareness networking scheme, for example, a discovery scheme, for example, a Wi-Fi Aware discovery scheme ("NAN discovery scheme"), and/or any other awareness networking and/or discovery scheme, e.g., as described below.

In some demonstrative embodiments, the awareness networking scheme, e.g., NAN, may enable applications to discover services in their close proximity. For example, the NAN technology may be a low power service discovery, which may, for example, scale efficiently, e.g., in dense Wi-Fi environments.

In some demonstrative embodiments, a device, e.g., wireless communication device 102 and/or wireless communication device 140, may include one or more blocks and/or entities to perform network awareness functionality. For example, a device, e.g., device 102 and/or device 140, performing the functionality of a NAN device, may include a NAN MAC and/or a Discovery Engine (DE). In one example, controller 124 may be configured to perform the functionality of the discovery engine, and/or message processor 128 may be configured to perform the functionality of the NAN MAC, e.g., as described above. In another example, the functionality of the NAN MAC and/or the Discovery engine may be performed by any other element and/or entity of device 102 and/or device 140.

In some demonstrative embodiments, the awareness networking scheme may include a discovery scheme or protocol, e.g., as described below.

In some demonstrative embodiments, device 102 and/or device 140 may perform a discovery process according to the awareness networking scheme, for example, to discover each other and/or to establish a wireless communication link, e.g., directional and/or high throughput wireless communication link and/or any other link.

In some demonstrative embodiments, device 102 and/or device 140 may be configured to enable time synchronization between devices 102, 140 and/or one or more other devices, e.g., performing the functionality of Wi-Fi stations (STAs), for example, such that STAs can discover each other more efficiently and/or quickly.

Some demonstrative embodiments are described below with respect to a NAN discovery scheme, and to NAN discovery frames of the NAN discovery scheme. However, in other embodiments, any other discovery scheme and/or discovery frames may be used.

In some demonstrative embodiments, the discovery scheme may include a plurality of contention-based discovery windows (DWs).

In some demonstrative embodiments, communication during the DWs may be configured to enable time synchronization between Wi-Fi stations (STAs), e.g., device 102 and/or device 140, such that, for example, STAs may be able to find each other more efficiently during a DW.

In some demonstrative embodiments, devices of an awareness network, e.g. a NAN network, may form one or more clusters, e.g., in order to publish and/or subscribe for services. A NAN cluster may be defined by an Anchor Master (AM) (also referred to as a "NAN master device" or "anchor device"). In one example, the AM may include a NAN device, which has the highest rank in the NAN cluster.

In some demonstrative embodiments, NAN data exchange may be reflected by discovery frames, e.g., Publish, Subscribe and/or Follow-Up Service discovery frames (SDF). These frames may include action frames, which may be sent by a device that wishes to publish a service/application, and/or to subscribe to a published service/application at another end.

In one example, one of device 102 and/or device 140, e.g., device 102, may perform the functionality of an AM. The AM may be configured to transmit one or more beacons. Another one of device 102 and/or device 140, e.g., device 140, may be configured to receive and process the beacons.

In one example, device 102 and/or device 140 may perform the functionality of NAN devices, e.g., belonging to a NAN cluster, which may share a common set of NAN parameters, for example, including a common NAN timestamp, and/or a common time period between consecutive discovery windows (DWs). The NAN timestamp may be communicated, for example, as part of a NAN beacon frame, which may be communicated in the NAN cluster. In one example, the NAN timestamp may include a Time Synchronization Function (TSF) value, for example, a cluster TSF value, or any other value.

In some demonstrative embodiments, device 102 and/or device 140 may be configured to discover one another over a predefined communication channel ("the social channel"). In one example, the Channel 6 in the 2.4 GHz band may be defined as the NAN social channel Any other channel may be used as the social channel.

In some demonstrative embodiments, device 102 and/or device 140 may transmit discovery frames, e.g., SDFs, during the plurality of DWs, e.g., over the social channel. For example the NAN AM may advertize the time of the DW, during which NAN devices may exchange SDFs.

In one example, device 102 and/or device 140 may transmit the discovery frames to discover each other, for example, to enable using the one or more services provided by applications 125 and/or 126.

In some demonstrative embodiments, device 102 and/or device 140 may communicate during a DW according to a contention mechanism. For example, device 102 and/or device 140 may check whether or not a channel is unoccupied prior to an attempt to transmit a discovery frame during the discovery window.

In some demonstrative embodiments, a device, e.g., device 102, may not transmit the discovery frame during the DW, e.g., if the channel is occupied. In some demonstrative embodiments, device 102 may transmit the discovery frame during the DW, e.g., if the channel is unoccupied.

In some embodiments, the discovery frame may be transmitted as a group addressed, e.g., broadcast or multicast, discovery frame. In other embodiments, the discovery frame may be transmitted as any other type of frame.

In some demonstrative embodiments, the discovery frame may not require an acknowledgement frame. According to these embodiments, a transmitter of the discovery frame may not backoff a transmission of the discovery frame.

In some demonstrative embodiments, the discovery frame transmitted by device 102 during the DW may be configured to enable other devices or services that are running on other devices to discover the services on device 102.

In some demonstrative embodiments, devices of system 100 may utilize availability information, e.g., in the form of an Availability Interval Bitmap and/or Further Availability Map, for example, to allow a device, e.g., device 102 and/or device 140, to advertise its availability, for example, in terms of at least one channel and one or more timeslots, during which the device may be available, e.g., active ("awake"), for example, to perform post NAN activities.

In one example, the availability information may be communicated as part of an Availability Attribute, e.g., including a 32-bit bitmap for 32 timeslots, for example, wherein each timeslot is 16 milliseconds (ms) long. For example, each bit that is not zero may represent a timeslot, during which a device sending the Availability attribute is to awake and available to send and/or receive data in a specified method.

In some demonstrative embodiments, the awareness networking scheme, e.g., a NAN discovery scheme, may be configured to enable pre-associated service discovery, for example, to synchronize Wi-Fi Stations (STAs) in a STA To STA (S2S) environment, for example, to enable the STAs to discover and trigger connectivity and/or other interactions between the STAs, e.g., based on services the STAs publish and/or subscribe to.

In some demonstrative embodiments, the NAN discovery scheme may include a time synchronization aspect, e.g., a time synchronization phase, and a service discovery aspect, e.g., a service discovery phase.

Figure 2:
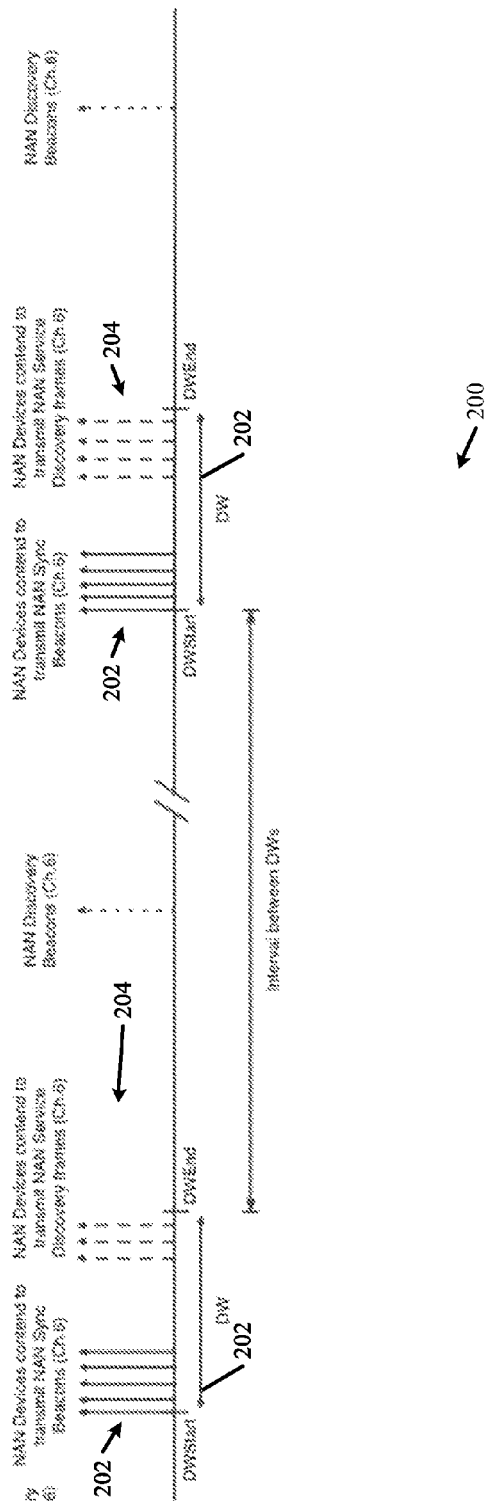
FIG. 2 is a schematic illustration of a Neighbor Awareness Networking (NAN) discovery scheme, in accordance with some demonstrative embodiments.

Reference is made to FIG. 2, which schematically illustrates a NAN discovery scheme 200, in accordance with some demonstrative embodiments. For example, device 102 and/or device 140 (FIG. 1) may be configured to perform one or ore operations of NAN discovery scheme 200.

As shown in FIG. 2, a service discovery may be performed, for example, by transmitting and/or receiving Service Discovery Frames (SDFs) 204 during Discovery Windows (DWs) 202, e.g., during the service discovery phase.

As shown in FIG. 2, timing and/or duration of the DWs 202 may be based on timing synchronization during a time synchronization phase within DW 202, for example, by transmitting and/or receiving NAN Sync beacons 206.

Referring back to FIG. 1, in some demonstrative embodiments, device 102 may be configured to provide one or more services, for example, based on a range and/or a distance between device 102 and another NAN device, e.g., device 140.

In one example, device 102 may be configured to provide content, e.g., music, to one or more devices of coffee shop costumers, for example, if the customers are within a boundary, e.g., of 10 meters (m) or less, or any other boundary, from the coffee shop; and/or to stop to provide the content, for example, if the costumers are no longer within the boundary.

In another example, device 102 may be configured to provide to a user a notification that a friend is associated through an application, e.g., a social application, for example, if a friend is within a predefined range; and/or to stop to notify the user, for example, if the friend is no longer within the predefined range.

In some demonstrative embodiments, a range measurement between device 102 and another NAN device, e.g., device 140, may be used to determine a range between device 102 and 140.

In some demonstrative embodiments, a fixed rate ranging method may be performed, for example, when another NAN device is identified.

In some demonstrative embodiments, the fixed rate ranging method may be "medium wasteful", for example, if an update rate of the range measurement is fixed, e.g., if no threshold exists, for example, to change the rate.

Additionally or alternatively, the fixed rate ranging method may be "power wasteful", e.g., if the measurement rate is fixed and a processor needs to match between application requirements and the range measurement and to configure the baseband accordingly.

In some demonstrative embodiments, device 102 may be configured to optimize ranging measurements, e.g., using a Fine Timing Measurement (FTM) procedure or any other ranging procedure, for example, such that the medium and/or power may be used with increased efficiency, for example, only when needed, e.g., depending on application requirements and/or a current position of the device.

In some demonstrative embodiments, device 102 may be configured to enable an awareness networking device, e.g., a NAN device, to utilize geo-fencing proximity services, e.g., as described below.

In some demonstrative embodiments, an application of device 102 may be configured to provide information to enable NAN module 120 to utilize the geo-fencing proximity services.

In some demonstrative embodiments, an application of device 102, e.g., application 125, may be configured to provide to NAN module 120 a plurality of geo-fencing parameters 123 of a geofence.

In some demonstrative embodiments, the plurality of geo-fencing parameters 123 may include a geo-fencing type.

In some demonstrative embodiments, the geo-fencing type may include a value to indicate an internal perimeter geo-fence, an external perimeter geo-fence, an external polygonal perimeter geo-fence, an internal polygonal perimeter geo-fence, a pure distance geo-fence, and/or any other indication of any other additional or alternative geo-fencing type.

Figure 3:
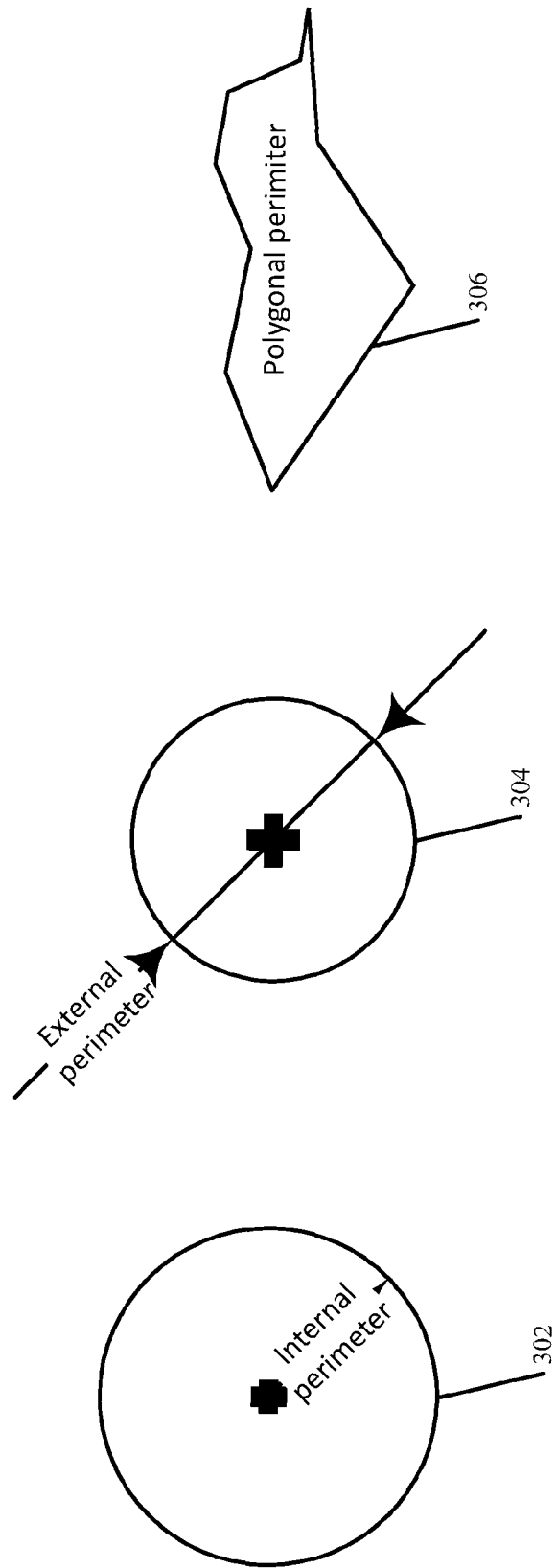
FIG. 3 is a schematic illustration of geo-fencing types, in accordance with some demonstrative embodiments.

Reference is made to FIG. 3, which schematically illustrates geo-fencing types, in accordance with some demonstrative embodiments.

As shown in FIG. 3, the geo-fencing types may include an internal perimeter geo-fence 302, an external perimeter geo-fence 304, and/or a polygonal perimeter geo-fence 306.

In some demonstrative embodiments, the geo-fencing types may include a single-event purer-distance geo-fence (not shown in FIG. 3). For example, the pure-distance geo-fence may be crossed by a device, for example, when a measured range from the device is equal to or less than a distance value.

In other embodiments one or more additional and/or alternative geo-fencing types may be used.

In some demonstrative embodiments, the internal perimeter geo-fence 302 may be defined by a perimeter surrounding an internal area.

In some demonstrative embodiments, an internal perimeter geo-fence, e.g., internal perimeter geo-fence 302, may be crossed by a device, for example, when the device crosses the perimeter to move out from the internal area, e.g., to an external area surrounding the perimeter.

In some demonstrative embodiments, internal perimeter geo-fence 302 may be defined, for example, by a radius and a point of origin. In some demonstrative embodiments, the external perimeter geo-fence 304 may be defined by an external area surrounding a perimeter.

In some demonstrative embodiments, an external perimeter geo-fence, e.g., external perimeter geo-fence 304, may be crossed by a device, for example, when the device crosses the perimeter from the external area, e.g., into an area surrounded by the perimeter.

In some demonstrative embodiments, external perimeter geo-fence 304 may be defined, for example, by a radius and a point of origin.

In some demonstrative embodiments, the polygonal perimeter geo-fence 306 may be defined by a polygon surrounding a polygonal internal area. The polygonal perimeter geo-fence 306 may include an internal geo-fence or an external geo-fence.

In one example, an internal polygonal perimeter geo-fence, e.g., polygonal perimeter geo-fence 306, may be crossed by a device, for example, when the device crosses the polygonal perimeter to move out from the polygonal area, e.g., to an external area surrounding the perimeter.

In another example, an external polygonal perimeter geo-fence, e.g., polygonal perimeter geo-fence 306, may be crossed by a device, for example, when the device crosses the polygonal perimeter to move into the polygonal area, e.g., from an external area surrounding the perimeter.

In some demonstrative embodiments, polygonal perimeter geo-fence 306 may be defined, for example, by coordinates of three or more points. The coordinates may include one or more relative coordinates and/or one or more absolute coordinates.

In some demonstrative embodiments, the plurality of geo-fencing parameters 123 (FIG. 1) may include a geo-fence description of the geofence.

In one example, the geo-fence description may include coordinates, e.g., Cartesian coordinates, of three or more points, for example, if the geo-fence type includes polygonal perimeter geo-fence 306.

In one example, the geo-fence description may include a location, e.g., an origin point, and a radius, for example, if the geo-fence type includes internal perimeter geo-fence 302 or external perimeter geo-fence 304.

Referring back to FIG. 1, in some demonstrative embodiments, the plurality of geo-fencing parameters 123 may include an allowed report delay, for example, to indicate an allowed delay to report crossing of the geofence, for example, to an upper layer, for example, to an application, e.g., application 125, from which geo-fencing parameters 123 are received.

In one example, the allowed report delay may be 300 milliseconds (ms). According to this example, controller 120 may report to application 125 that device 140 crosses the geofence, e.g., no later than 300 ms from determining the actual crossing of the geofence by device 140.

In some demonstrative embodiments, the plurality of geo-fencing parameters 123 may include a minimum measurement rate, for example, to indicate a rate of range measurements between device 102 and the device 140.

In some demonstrative embodiments, the minimum measurement rate may indicate a rate to perform range measurements between device 102 and the device 140, for example, if the geofence is crossed.

In one example, the minimum measurement rate may be to two seconds. According to this example, device 102 may perform range measurements with device 140, e.g., once device 140 cross the geofence, for example, every 2 seconds (sec) or less.

In some demonstrative embodiments, application 125 may provide the plurality of geo-fencing parameters 123 to NAN module 120, for example, via interface 122.

In some demonstrative embodiments, application 125 may generate at least one method call to interface 122. For example application 125 may generate a function, a function call, a callback, and/or any other routine from application 125 to interface 122.

In some demonstrative embodiments, the method call may include the geo-fencing parameters 123.

In some demonstrative embodiments, interface 122, e.g., the NAN API, may receive the plurality of geo-fencing parameters 123, for example, from application 125.

In some demonstrative embodiments, NAN module 120 may receive the plurality of geo-fencing parameters 123 via interface 122.

In some demonstrative embodiments, interface 122 may receive the at least one method call from application 125, e.g., including the geo-fencing parameters 123.

In some demonstrative embodiments, the method call may include a publish method call.

In some demonstrative embodiments, the publish method call may have a format including one or more configuration parameters, e.g., as follows:

Publish(service_name, matching_filter_tx, matching_filter_rx, service_specific_info, configuration_parameters)

In some demonstrative embodiments, the geo-fencing parameters 123 may be included as part of the configuration parameters of the publish method call.

In some demonstrative embodiments, the plurality of geo-fencing parameters 123 may be included as part of a Ranging Type parameter, an Allowed report delay parameter, a Minimum ranging rate parameter, and/or a Geo fence description parameter of the publish method call In some demonstrative embodiments, the Ranging Type parameter, the Allowed report delay parameter, the Minimum ranging rate parameter, and/or the Geo fence description parameter may be included as part of the Configuration parameters of the publish method call, e.g., as follows:

service_name
- UTF-8 name string which identifies the service/application matching_filter_tx
- Ordered sequence of <length, value> pairs to be included in the discovery frame matching_filter_rx
- Ordered sequence of <length, value> pairs which specify further response conditions beyond the service name used to filter subscribe messages to respond to service_specific_info
- Sequence of values which should be conveyed to the Discovery Engine of a NAN Device that has invoked a Subscribe method corresponding to this Publish method.

configuration_parameters

Publish type
- Determines the type of Publishing as follows
  - Unsolicited transmissions only
  - Solicited transmissions only
  - Both unsolicited and solicited transmissions Discovery range
- Determines whether the service is made discoverable in close proximity only or to any NAN Devices within range Ranging Type
- 00: internal perimeter
- 01: external perimeter
- 02: polygonal perimeter external
- 03: polygonal perimeter internal
- 04: single event pure distance Allowed report delay
- Indicates the delay between the actual physical event and the indication to upper layer of event occurrence Minimum ranging rate
- Indicates the minimum distance measurement rate with the pears, once the service is obtained Geo fence description
- The description of the geo-fence, e.g., radius for pure internal or external perimeter, a set of relative or absolute coordinate for a polygon description, and/or any other information Solicited transmission type
- Determines whether a solicited transmission is a unicast or a multicast transmission Announcement period
- Recommended periodicity of unsolicited transmissions Time to live
- The instance of the Publish function can be commanded to run for a given time interval or for one transmission only Event conditions
- Determines when Publish related events are generated. Events can be requested to be generated on each solicited transmission. Alternatively, no events are expected.

Matching filter flag
- Zero (0) if matching_filter_tx is equal to matching_filter_rx
- One (1) if matching_filter_tx is not equal to matching_filter_rx In other embodiments, the geo-fencing parameters 123 may be included as part of any other additional or alternative parameter, field or information element, of the publish method call.

In some demonstrative embodiments, the method call may include a subscribe method call.

In some demonstrative embodiments, the subscribe method call may have a format including one or more configuration parameters, e.g., as follows:

Subscribe(service_name, matching_filter_tx, matching_filter_rx, service_specific_info, configuration_parameters)

In some demonstrative embodiments, the geo-fencing parameters 123 may be included as part of the configuration parameters of the subscribe method call.

In some demonstrative embodiments, the plurality of geo-fencing parameters 123 may be included as part of a Ranging Type parameter, an Allowed report delay parameter, a Minimum ranging rate parameter, and/or a Geo fence description parameter of the subscribe method call In some demonstrative embodiments, the Ranging Type parameter, the Allowed report delay parameter, the Minimum ranging rate parameter, and/or the Geo fence description parameter may be included as part of the Configuration parameters of the subscribe method call, e.g., as follows:

service_name
- UTF-8 name string which identifies the service/application matching_filter_rx
- Ordered sequence of <length, value> pairs used to filter out received publish discovery messages containing the service name matching_filter_tx
- Ordered sequence of <length,value> pairs included beyond the service name when active subscription is used that are included in the discovery frame service_specific_info
- Sequence of values which further specify the published service beyond the service name configuration_parameters Subscribe type
- Determines the type of Subscribe as follows
  - Passive
  - Active Discovery range
    Determines whether the service is searched in close proximity only or in any NAN Devices within range
Ranging Type
    00: internal perimeter
    01: external perimeter
    02: polygonal perimeter external
    03: polygonal perimeter internal
    04: single event pure distance
Allowed report delay
    Indicates the delay between the actual physical event and the indication to upper layer of event occurrence
Minimum ranging rate
    Indicates the minimum distance measurement rate with the pears, once the service is obtained
Geo fence description
    The description of the geo-fence, e.g., radius for pure internal or external perimeter, a set of relative or absolute coordinate for a polygon description, and/or any other information
Query period
    Recommended periodicity of query transmissions
Time to live
    The instance of the Subscribe function can be commanded to run for a given time interval or until the first DiscoveryResult event
Matching filter flag
    Zero (0) if matching_filter_tx is equal to matching_filter_rx
    One (1) if matching_filter_tx is not equal to matching_filter_rx In other embodiments, the geo-fencing parameters 123 may be included as part of any other additional or alternative parameter, field or information element, of the subscribe method call.

In other embodiments, the geo-fencing parameters 123 may be included as part of any other additional or alternative parameter, field or information element, of any other additional or alternative method call.

In some demonstrative embodiments, the Ranging Type parameter, e.g., in the subscribe method call and/or the publish method call, may indicate, for example, the type of an event notification, e.g., internal perimeter, external perimeter, internal polygonal perimeter, external polygonal perimeter, pure distance, and/or any other type.

In some demonstrative embodiments, the internal perimeter geo-fence type and/or the external perimeter geo-fence type may be configured, for example, to trigger sending an event, e.g., from NAN module 120 to application 125, during a change of the distance.

In some demonstrative embodiments, the pure distance geo-fencing type may be configured, for example, to trigger sending an event, e.g., from NAN module 120 to application 125, for example, at a predefined, e.g., fixed, rate.

In some demonstrative embodiments, controller 124, e.g., the NAN DE, may receive the plurality of geo-fencing parameters 123, for example, from interface 122, for example, via the method call, e.g., the subscribe method call or the publish method call, and/or via any other function, routine or message.

In some demonstrative embodiments, controller 124 may process the plurality of geo-fencing parameters 123.

In some demonstrative embodiments, controller 124 may perform geo-fencing with another NAN device, e.g., device 140, for example, based on the plurality of geo-fencing parameters 123.

In some demonstrative embodiments, controller 124 may perform range measurements with the other NAN device e.g., device 140, at a fixed measurement rate.

In some demonstrative embodiments, the fixed measurement rate may be determined, for example, based the plurality of geo-fencing parameters 123, e.g., based at least on the allowed report delay, and/or the minimum measurement rate.

In some demonstrative embodiments, controller 124 may perform range measurements with the other NAN device e.g., device 140, at a variable measurement rate.

In some demonstrative embodiments, the measurement rate may be changed and/or adjusted, for example, based at least on a distance between the other NAN device and the perimeter. For example, the rate may increase as the other NAN device approaches the perimeter.

In some demonstrative embodiments, message processor 128, e.g., the NAN MAC, may communicate one or more NAN messages with device 140, In one example, message processor 128 may communicate the one or more NAN messages with device 140, for example, to discover device 140, to communicate with device 140, to perform geo-fencing with device 140, to coordinate one or more range measurements with device 140, to perform the one or more range measurements with device 140, and/or to perform any other operations with respect to device 140.

In some demonstrative embodiments, message processor 128 may communicate one or more Fine Time Measurement (FTM) messages with the other NAN device, e.g., based on the geo-fencing parameters 123.

In one example, message processor 128 may communicate the one or more FTM messages to perform range measurements at a measurement rate, which is based on the minimum measurement rate.

In another example, message processor 128 may determine whether or not to communicate the one or more FTM messages, for example, based on a distance of device 140 from a polygonal perimeter, for example, if the geo-fencing parameters 123 indicate the polygonal parameter geo-fence.

In another example, message processor 128 may determine whether or not to communicate the one or more FTM messages, for example, based on a distance of device 140 from an internal perimeter, for example, if the geo-fencing parameters 123 indicate the internal parameter geo-fence.

In another example, message processor 128 may determine whether or not to communicate the one or more FTM messages, for example, based on a distance of device 140 from an external perimeter, for example, if the geo-fencing parameters 123 indicate the external parameter geo-fence.

In some demonstrative embodiments, controller 124 may be configured to provide to one or more applications of device 102, e.g., application 125, one or more indications with respect to the another NAN device, e.g., device 140, for example, based on the geo-fencing parameters 123.

In some demonstrative embodiments, controller 124 may be configured to provide to application 125 at least one indication that the geofence is crossed, for example, based on the geo-fencing parameters 123.

In one example, the plurality of geo-fencing parameters 123 may include a geo-fence type parameter to indicate a geo-fence type of an internal perimeter, and a geofence description parameter indicating a radius of five meters. According to this example, controller 124 may provide an indication that the geofence is crossed, for example, if range measurements indicate that device 140 is at a range of less than five meters from device 102.

In some demonstrative embodiments, controller 124 may provide the indications to the one or more applications of device 102, for example, using interface 122.

In one example, controller 124 may use interface 122 to provide an indication to application 125, e.g., via the subscribe method call or the publish method call, that device 140 has crossed the geofence.

In some demonstrative embodiments, application 125 may receive the one or more indications from NAN module 120, for example, with respect to the geo-fence, e.g., the indication that the geofence is crossed.

In some demonstrative embodiments, the one or more indications may be based on the plurality of geo-fencing parameters 123, e.g., as described above.

In some demonstrative embodiments, application 125 may perform one or more operations based on the one or more indications.

In one example, application 125 may be configured to provide one or more deals offered by a shop to a user, for example, based on an external perimeter geo-fence defined around the shop. According to this example, application 125 may provide the one or more deals to the user, for example, if application 125 receives an indication from controller 124 that the user crossed the external perimeter geo-fence.

In some demonstrative embodiments, providing the plurality of geo-fencing parameters 123, e.g., from applications 125 to controller 124, may enable device 102 to perform geo-fencing with another NAN device, e.g., device 140, according to the plurality of geo-fencing parameters 123, e.g., at least in a medium-efficient manner and/or a power-efficient manner.

Figure 4:
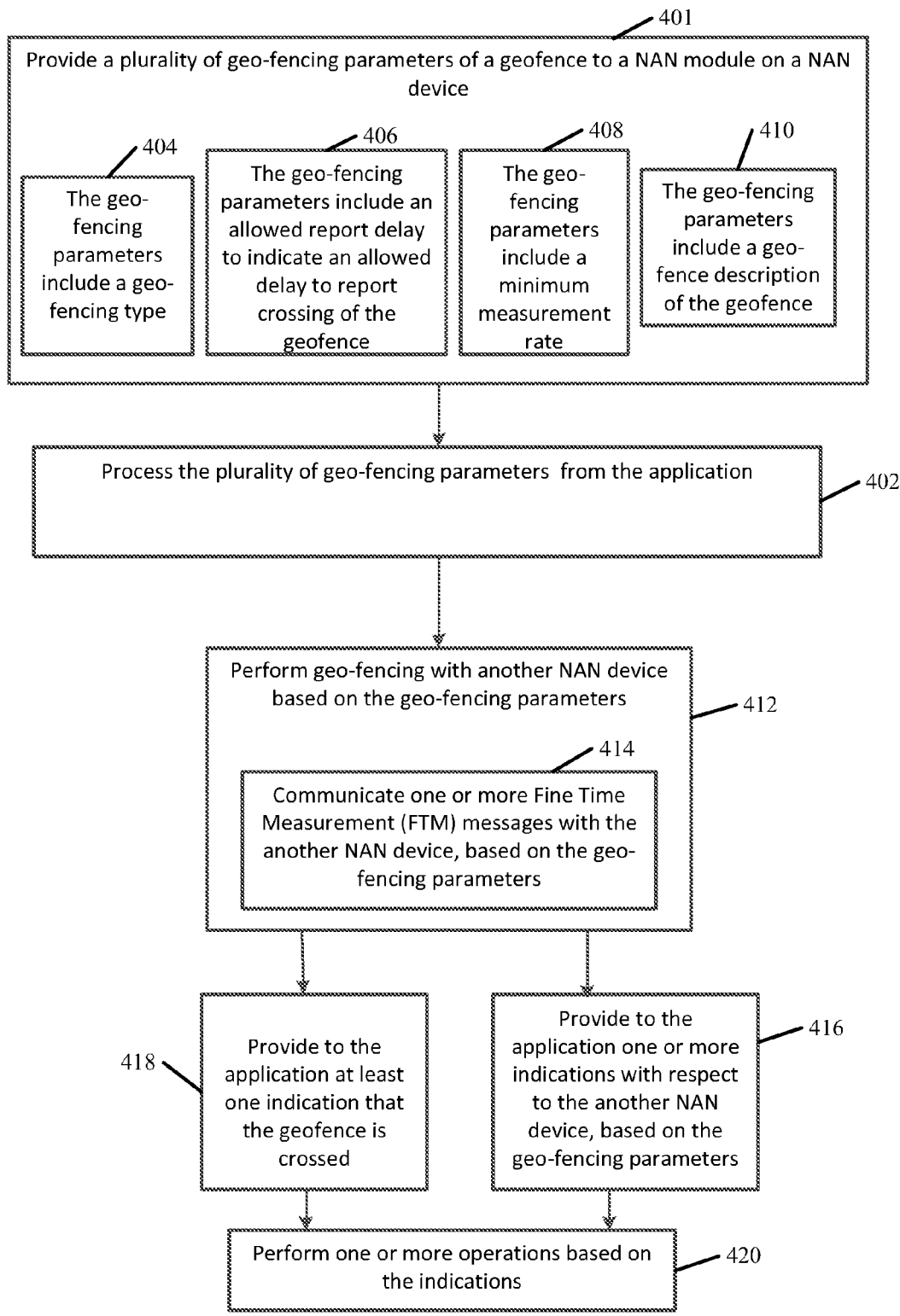
FIG. 4 is a schematic flow-chart illustration of a method of Neighbor Awareness Networking (NAN) Geo-Fencing, in accordance with some demonstrative embodiments.

Reference is made to FIG. 4, which schematically illustrates a method of Geo-Fencing in a Neighbor Awareness Networking (NAN) device, in accordance with some demonstrative embodiments. For example, one or more of the operations of the method of FIG. 4 may be performed by one or more elements of a system, e.g., system 100 (FIG. 1); a device, e.g., wireless communication devices 102, and/or 140 (FIG. 1); a NAN module, e.g., NAN module 120 (FIG. 1); a controller, e.g., controller 124 (FIG. 1); a radio, e.g., radio 114 (FIG. 1); and/or a message processor, e.g., message processor 128 (FIG. 1).

As indicated at block 401, the method may include providing to a NAN module of a NAN device a plurality of geo-fencing parameters of a geofence. For example, application 125 (FIG. 1) may provide to NAN module 120 (FIG. 1) the plurality of geo-fencing parameters 123 (FIG. 1), for example, via interface 122 (FIG. 1), e.g., as described above.

As indicated at block 404, the geo-fencing parameters may include a geo-fencing type to indicate a type of the geofence. For example the geo-fencing type may include a value to indicate an internal perimeter geo-fence, an external perimeter geo-fence, an external polygonal perimeter geo-fence, an internal polygonal perimeter geo-fence, a pure distance geo-fence, and/or any other geo-fence type. For example, geo-fencing parameters 123 (FIG. 1) may include the geo-fencing type, e.g., as described above.

As indicated at block 406, the geo-fencing parameters may include an allowed report delay to indicate an allowed delay to report crossing of the geofence. For example, geo-fencing parameters 123 (FIG. 1) may include the allowed report delay to indicate the allowed delay to report crossing of the geofence, e.g., as described above.

As indicated at block 408, the geo-fencing parameters may include a minimum measurement rate to indicate a rate of range measurements between the NAN device and the other NAN device. For example, geo-fencing parameters 123 (FIG. 1) may include the minimum measurement rate to indicate a rate of range measurements between device 102 (FIG. 1) and another device, e.g., device 140 (FIG. 1), e.g., as described above.

As indicated at block 410, the geo-fencing parameters may include a geo-fence description of the geofence. For example, geo-fencing parameters 123 (FIG. 1) may include the geo-fence description of the geofence, e.g., as described above.

As indicated at block 402, the method may include processing the plurality of geo-fencing parameters of the geofence. For example, controller 124 (FIG. 1) may process the plurality of geo-fencing parameters 123 (FIG. 1), e.g., from application 125 (FIG. 1), e.g., as described above.

As indicated at block 412, the method may include performing geo-fencing with another NAN device, for example, based at least on the geo-fencing parameters. For example, controller 124 (FIG. 1) may perform geo-fencing with device 140 (FIG. 1), e.g., based at least on the plurality of geo-fencing parameters 123 (FIG. 1), e.g., as described above.

As indicated at block 414, performing geo-fencing with the other NAN device may include communicating one or more Fine Time Measurement (FTM) messages with the other NAN device, for example, based at least on the geo-fencing parameters. For example, message processor 128 (FIG. 1) may communicate one or more FTM messages with device 140 (FIG. 1), for example, based on the plurality of geo-fencing parameters 123 (FIG. 1), e.g., as described above.

As indicated at block 416, the method may include providing to the application one or more indications with respect to the other NAN device, e.g., based at least on the geo-fencing parameters. For example, controller 124 (FIG. 1) may provide to application 125 (FIG. 1) one or more indications with respect to device 140 (FIG. 1), e.g., based on the plurality of geo-fencing parameters 123 (FIG. 1), e.g., as described above.

As indicated at block 418, the method may include providing to the application at least one indication that the geofence is crossed. For example, controller 124 (FIG. 1) may provide to application 125 (FIG. 1) the indication that the geofence is crossed by device 140 (FIG. 1), e.g., as described above.

As indicated at block 420, the method may include performing one or more operations based on the one or more indications. For example, application 125 (FIG. 1) may perform one or more operations, for example, based on an indication that the geo-fence is crossed by device 140 (FIG. 1), e.g., as described above.

Figure 5:
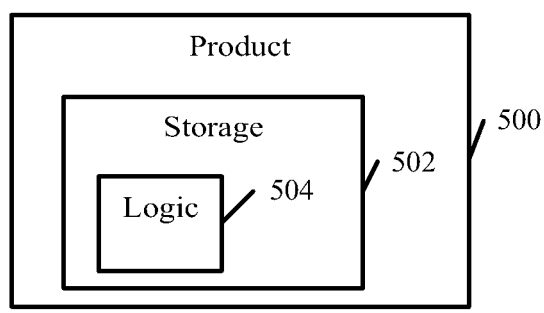
FIG. 5 is a schematic illustration of a product, in accordance with some demonstrative embodiments.

Reference is made to FIG. 5, which schematically illustrates a product of manufacture 500, in accordance with some demonstrative embodiments. Product 500 may include a non-transitory machine-readable storage medium 502 to store logic 504, which may be used, for example, to perform at least part of the functionality of devices 102 (FIG. 1) and/or 140 (FIG. 1), radio 114 (FIG. 1), transmitter 118 (FIG. 1), receiver 116 (FIG. 1), NAN module 120 (FIG. 1), interface 122 (FIG. 1), controller 124 (FIG. 1), and/or message processor 128 (FIG. 1), and/or to perform one or more operations of the method of FIG. 4. The phrase "non-transitory machine-readable medium" is directed to include all computer-readable media, with the sole exception being a transitory propagating signal.

In some demonstrative embodiments, product 500 and/or machine-readable storage medium 502 may include one or more types of computer-readable storage media capable of storing data, including volatile memory, non-volatile memory, removable or non-removable memory, erasable or non-erasable memory, writeable or re-writeable memory, and the like. For example, machine-readable storage medium 502 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 504 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 504 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising circuitry configured to cause a Neighbor Awareness Networking (NAN) device to process a plurality of geo-fencing parameters of a geofence from an application on the NAN device; and perform geo-fencing with another NAN device based on the geo-fencing parameters.

Example 2 includes the subject matter of Example 1, and optionally, wherein the plurality of geo-fencing parameters comprises a geo-fencing type, the geo-fencing type comprising a value to indicate an internal perimeter geofence, an external perimeter geofence, an external polygonal perimeter geofence, an internal polygonal perimeter geofence, or a pure distance geofence.

Example 3 includes the subject matter of Example 1 or 2, and optionally, wherein the plurality of geo-fencing parameters comprises an allowed report delay to indicate an allowed delay to report crossing of the geofence.

Example 4 includes the subject matter of any one of Examples 1-3, and optionally, wherein the plurality of geo-fencing parameters comprises a minimum measurement rate to indicate a rate of range measurements between the NAN device and the another NAN device.

Example 5 includes the subject matter of any one of Examples 1-4, and optionally, wherein the plurality of geo-fencing parameters comprises a geo-fence description of the geofence.

Example 6 includes the subject matter of any one of Examples 1-5, and optionally, comprising a NAN engine to process the plurality of geo-fencing parameters, and a NAN media access control (MAC) to communicate one or more NAN messages with the another NAN device.

Example 7 includes the subject matter of any one of Examples 1-6, and optionally, comprising at least one NAN Application Protocol Interface (API) to receive the plurality of geo-fencing parameters from the application.

Example 8 includes the subject matter of Example 7, and optionally, wherein the NAN API is to receive at least one method call from the application, the method call comprising the geo-fencing parameters.

Example 9 includes the subject matter of Example 8, and optionally, wherein the method call comprises a publish method call or a subscribe method call.

Example 10 includes the subject matter of any one of Examples 1-9, and optionally, being configured to cause the NAN device to provide to the application one or more indications with respect to the another NAN device, based on the geo-fencing parameters.

Example 11 includes the subject matter of any one of Examples 1-10, and optionally, being configured to cause the NAN device to provide to the application at least one indication that the geofence is crossed.

Example 12 includes the subject matter of any one of Examples 1-11, and optionally, being configured to cause the NAN device to communicate one or more Fine Time Measurement (FTM) messages with the another NAN device, based on the geo-fencing parameters.

Example 13 includes the subject matter of any one of Examples 1-12, and optionally, comprising a radio.

Example 14 includes the subject matter of any one of Examples 1-13, and optionally, comprising one or more antennas, a memory, and a processor.

Example 15 includes a Neighbor Awareness Networking (NAN) device comprising one or more antennas; a memory; a processor; a radio; and a NAN module to process a plurality of geo-fencing parameters of a geofence from an application on the NAN device, and to perform geo-fencing with another NAN device based on the geo-fencing parameters.

Example 16 includes the subject matter of Example 15, and optionally, wherein the plurality of geo-fencing parameters comprises a geo-fencing type, the geo-fencing type comprising a value to indicate an internal perimeter geofence, an external perimeter geofence, an external polygonal perimeter geofence, an internal polygonal perimeter geofence, or a pure distance geofence.

Example 17 includes the subject matter of Example 15 or 16, and optionally, wherein the plurality of geo-fencing parameters comprises an allowed report delay to indicate an allowed delay to report crossing of the geofence.

Example 18 includes the subject matter of any one of Examples 15-17, and optionally, wherein the plurality of geo-fencing parameters comprises a minimum measurement rate to indicate a rate of range measurements between the NAN device and the another NAN device.

Example 19 includes the subject matter of any one of Examples 15-18, and optionally, wherein the plurality of geo-fencing parameters comprises a geo-fence description of the geofence.

Example 20 includes the subject matter of any one of Examples 15-19, and optionally, wherein the NAN module comprises a NAN engine to process the plurality of geo-fencing parameters, and a NAN media access control (MAC) to communicate one or more NAN messages with the another NAN device.

Example 21 includes the subject matter of any one of Examples 15-20, and optionally, comprising at least one NAN Application Protocol Interface (API) to receive the plurality of geo-fencing parameters from the application.

Example 22 includes the subject matter of Example 21, and optionally, wherein the NAN API is to receive at least one method call from the application, the method call comprising the geo-fencing parameters.

Example 23 includes the subject matter of Example 22, and optionally, wherein the method call comprises a publish method call or a subscribe method call.

Example 24 includes the subject matter of any one of Examples 15-23, and optionally, wherein the NAN module is to provide to the application one or more indications with respect to the another NAN device, based on the geo-fencing parameters.

Example 25 includes the subject matter of any one of Examples 15-24, and optionally, wherein the NAN module is to provide to the application at least one indication that the geofence is crossed.

Example 26 includes the subject matter of any one of Examples 15-25, and optionally, wherein the NAN module is to communicate one or more Fine Time Measurement (FTM) messages with the another NAN device, based on the geo-fencing parameters.

Example 27 includes a method to be performed at a Neighbor Awareness Networking (NAN) device, the method comprising processing a plurality of geo-fencing parameters of a geofence from an application on the NAN device; and performing geo-fencing with another NAN device based on the geo-fencing parameters.

Example 28 includes the subject matter of Example 27, and optionally, wherein the plurality of geo-fencing parameters comprises a geo-fencing type, the geo-fencing type comprising a value to indicate an internal perimeter geofence, an external perimeter geofence, an external polygonal perimeter geofence, an internal polygonal perimeter geofence, or a pure distance geofence.

Example 29 includes the subject matter of Example 27 or 28, and optionally, wherein the plurality of geo-fencing parameters comprises an allowed report delay to indicate an allowed delay to report crossing of the geofence.

Example 30 includes the subject matter of any one of Examples 27-29, and optionally, wherein the plurality of geo-fencing parameters comprises a minimum measurement rate to indicate a rate of range measurements between the NAN device and the another NAN device.

Example 31 includes the subject matter of any one of Examples 27-30, and optionally, wherein the plurality of geo-fencing parameters comprises a geo-fence description of the geofence.

Example 32 includes the subject matter of any one of Examples 27-31, and optionally, comprising communicating one or more NAN messages with the another NAN device.

Example 33 includes the subject matter of any one of Examples 27-32, and optionally, comprising receiving the plurality of geo-fencing parameters from the application via an Application Protocol Interface (API).

Example 34 includes the subject matter of Example 33, and optionally, comprising receiving at least one method call from the application, the method call comprising the geo-fencing parameters.

Example 35 includes the subject matter of Example 34, and optionally, wherein the method call comprises a publish method call or a subscribe method call.

Example 36 includes the subject matter of any one of Examples 27-35, and optionally, comprising providing to the application one or more indications with respect to the another NAN device, based on the geo-fencing parameters.

Example 37 includes the subject matter of any one of Examples 27-36, and optionally, comprising providing to the application at least one indication that the geofence is crossed.

Example 38 includes the subject matter of any one of Examples 27-37, and optionally, comprising communicating one or more Fine Time Measurement (FTM) messages with the another NAN device, based on the geo-fencing parameters.

Example 39 includes a product comprising one or more tangible computer-readable non-transitory storage media comprising computer-executable instructions operable to, when executed by at least one computer processor, enable the at least one computer processor to perform one or more operations at a Neighbor Awareness Networking (NAN) device, the operations comprising processing a plurality of geo-fencing parameters of a geofence from an application on the NAN device; and performing geo-fencing with another NAN device based on the geo-fencing parameters.

Example 40 includes the subject matter of Example 39, and optionally, wherein the plurality of geo-fencing parameters comprises a geo-fencing type, the geo-fencing type comprising a value to indicate an internal perimeter geofence, an external perimeter geofence, an external polygonal perimeter geofence, an internal polygonal perimeter geofence, or a pure distance geofence.

Example 41 includes the subject matter of Example 39 or 40, and optionally, wherein the plurality of geo-fencing parameters comprises an allowed report delay to indicate an allowed delay to report crossing of the geofence.

Example 42 includes the subject matter of any one of Examples 39-41, and optionally, wherein the plurality of geo-fencing parameters comprises a minimum measurement rate to indicate a rate of range measurements between the NAN device and the another NAN device.

Example 43 includes the subject matter of any one of Examples 39-42, and optionally, wherein the plurality of geo-fencing parameters comprises a geo-fence description of the geofence.

Example 44 includes the subject matter of any one of Examples 39-43, and optionally, wherein the operations comprise communicating one or more NAN messages with the another NAN device.

Example 45 includes the subject matter of any one of Examples 39-44, and optionally, wherein the operations comprise receiving the plurality of geo-fencing parameters from the application via an Application Protocol Interface (API).

Example 46 includes the subject matter of Example 45, and optionally, wherein the operations comprise receiving at least one method call from the application, the method call comprising the geo-fencing parameters.

Example 47 includes the subject matter of Example 46, and optionally, wherein the method call comprises a publish method call or a subscribe method call.

Example 48 includes the subject matter of any one of Examples 39-47, and optionally, wherein the operations comprise providing to the application one or more indications with respect to the another NAN device, based on the geo-fencing parameters.

Example 49 includes the subject matter of any one of Examples 39-48, and optionally, wherein the operations providing to the application at least one indication that the geofence is crossed.

Example 50 includes the subject matter of any one of Examples 39-49, and optionally, wherein the operations comprise communicating one or more Fine Time Measurement (FTM) messages with the another NAN device, based on the geo-fencing parameters.

Example 51 includes an apparatus of wireless communication by a Neighbor Awareness Networking (NAN) device, the apparatus comprising means for processing a plurality of geo-fencing parameters of a geofence from an application on the NAN device; and means for performing geo-fencing with another NAN device based on the geo-fencing parameters.

Example 52 includes the subject matter of Example 51, and optionally, wherein the plurality of geo-fencing parameters comprises a geo-fencing type, the geo-fencing type comprising a value to indicate an internal perimeter geofence, an external perimeter geofence, an external polygonal perimeter geofence, an internal polygonal perimeter geofence, or a pure distance geofence.

Example 53 includes the subject matter of Example 51 or 52, and optionally, wherein the plurality of geo-fencing parameters comprises an allowed report delay to indicate an allowed delay to report crossing of the geofence.

Example 54 includes the subject matter of any one of Examples 51-53, and optionally, wherein the plurality of geo-fencing parameters comprises a minimum measurement rate to indicate a rate of range measurements between the NAN device and the another NAN device.

Example 55 includes the subject matter of any one of Examples 51-54, and optionally, wherein the plurality of geo-fencing parameters comprises a geo-fence description of the geofence.

Example 56 includes the subject matter of any one of Examples 51-55, and optionally, comprising NAN engine means for processing the plurality of geo-fencing parameters, and NAN media access control (MAC) means for communicating one or more NAN messages with the another NAN device.

Example 57 includes the subject matter of any one of Examples 51-56, and optionally, comprising NAN Application Protocol Interface (API) means for receiving the plurality of geo-fencing parameters from the application.

Example 58 includes the subject matter of Example 57, and optionally, comprising means for receiving at least one method call from the application, the method call comprising the geo-fencing parameters.

Example 59 includes the subject matter of Example 58, and optionally, wherein the method call comprises a publish method call or a subscribe method call.

Example 60 includes the subject matter of any one of Examples 51-59, and optionally, comprising means for providing to the application one or more indications with respect to the another NAN device, based on the geo-fencing parameters.

Example 61 includes the subject matter of any one of Examples 51-60, and optionally, comprising means for providing to the application at least one indication that the geofence is crossed.

Example 62 includes the subject matter of any one of Examples 51-61, and optionally, comprising means for communicating one or more Fine Time Measurement (FTM) messages with the another NAN device, based on the geo-fencing parameters.

Example 63 includes a product comprising one or more tangible computer-readable non-transitory storage media comprising computer-executable instructions operable to, when executed by at least one computer processor, enable the at least one computer processor to perform one or more operations at a Neighbor Awareness Networking (NAN) device, the operations comprising providing to a NAN module a plurality of geo-fencing parameters of a geofence; and processing one or more geo-fencing indications from the NAN module with respect to the geofence, the geo-fencing indications being based on the plurality of geo-fencing parameters.

Example 64 includes the subject matter of Example 63, and optionally, wherein the plurality of geo-fencing parameters comprises a geo-fencing type, the geo-fencing type comprising a value to indicate an internal perimeter geofence, an external perimeter geofence, an external polygonal perimeter geofence, an internal polygonal perimeter geofence or a pure distance geofence.

Example 65 includes the subject matter of Example 63 or 64, and optionally, wherein the plurality of geo-fencing parameters comprises an allowed report delay to indicate an allowed delay to report when the geofence is crossed.

Example 66 includes the subject matter of any one of Examples 63-65, and optionally, wherein the plurality of geo-fencing parameters comprises a minimum measurement rate to indicate a rate of range measurements between the NAN device and another NAN device crossing the geofence.

Example 67 includes the subject matter of any one of Examples 63-66, and optionally, wherein the plurality of geo-fencing parameters comprises a geo-fence description of the geofence.

Example 68 includes the subject matter of any one of Examples 63-67, and optionally, wherein the one or more geo-fencing indications comprise an indication that the geofence is crossed.

Example 69 includes the subject matter of any one of Examples 63-68, and optionally, wherein the operations comprise providing the plurality of geo-fencing parameters to the NAN module via at least one method call.

Example 70 includes the subject matter of Example 69, and optionally, wherein the method call comprises a publish method call or a subscribe method call.

Example 71 includes the subject matter of any one of Examples 63-70, and optionally, wherein the NAN module comprises a NAN engine.

Example 72 includes a method to be performed at a Neighbor Awareness Networking (NAN) device, the method comprising providing to a NAN module a plurality of geo-fencing parameters of a geofence; and processing one or more geo-fencing indications from the NAN module with respect to the geofence, the geo-fencing indications being based on the plurality of geo-fencing parameters.

Example 73 includes the subject matter of Example 72, and optionally, wherein the plurality of geo-fencing parameters comprises a geo-fencing type, the geo-fencing type comprising a value to indicate an internal perimeter geofence, an external perimeter geofence, an external polygonal perimeter geofence, an internal polygonal perimeter geofence or a pure distance geofence.

Example 74 includes the subject matter of Example 72 or 73, and optionally, wherein the plurality of geo-fencing parameters comprises an allowed report delay to indicate an allowed delay to report when the geofence is crossed.

Example 75 includes the subject matter of any one of Examples 72-74, and optionally, wherein the plurality of geo-fencing parameters comprises a minimum measurement rate to indicate a rate of range measurements between the NAN device and another NAN device crossing the geofence.

Example 76 includes the subject matter of any one of Examples 72-75, and optionally, wherein the plurality of geo-fencing parameters comprises a geo-fence description of the geofence.

Example 77 includes the subject matter of any one of Examples 72-76, and optionally, wherein the one or more geo-fencing indications comprise an indication that the geofence is crossed.

Example 78 includes the subject matter of any one of Examples 72-77, and optionally, comprising providing the plurality of geo-fencing parameters to the NAN module via at least one method call.

Example 79 includes the subject matter of Example 78, and optionally, wherein the method call comprises a publish method call or a subscribe method call.

Example 80 includes the subject matter of any one of Examples 72-79, and optionally, wherein the NAN module comprises a NAN engine.

Example 81 includes an apparatus of wireless communication by a Neighbor Awareness Networking (NAN) device, the apparatus comprising means for providing to a NAN module a plurality of geo-fencing parameters of a geofence; and means for processing one or more geo-fencing indications from the NAN module with respect to the geofence, the geo-fencing indications being based on the plurality of geo-fencing parameters.

Example 82 includes the subject matter of Example 81, and optionally, wherein the plurality of geo-fencing parameters comprises a geo-fencing type, the geo-fencing type comprising a value to indicate an internal perimeter geofence, an external perimeter geofence, an external polygonal perimeter geofence, an internal polygonal perimeter geofence or a pure distance geofence.

Example 83 includes the subject matter of Example 81 or 82, and optionally, wherein the plurality of geo-fencing parameters comprises an allowed report delay to indicate an allowed delay to report when the geofence is crossed.

Example 84 includes the subject matter of any one of Examples 81-83, and optionally, wherein the plurality of geo-fencing parameters comprises a minimum measurement rate to indicate a rate of range measurements between the NAN device and another NAN device crossing the geofence.

Example 85 includes the subject matter of any one of Examples 81-84, and optionally, wherein the plurality of geo-fencing parameters comprises a geo-fence description of the geofence.

Example 86 includes the subject matter of any one of Examples 81-85, and optionally, wherein the one or more geo-fencing indications comprise an indication that the geofence is crossed.

Example 87 includes the subject matter of any one of Examples 81-86, and optionally, comprising means for providing the plurality of geo-fencing parameters to the NAN module via at least one method call.

Example 88 includes the subject matter of Example 87, and optionally, wherein the method call comprises a publish method call or a subscribe method call.

Example 89 includes the subject matter of any one of Examples 81-88, and optionally, wherein the NAN module comprises a NAN engine.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising circuitry configured to cause a Neighbor Awareness Networking (NAN) engine of a NAN device to:
   receive a method call from an application on said NAN device, via a NAN Application Protocol Interface (API) between the NAN engine and the application, the method call comprising a service name parameter to identify a service, one or more parameter values to be used by the NAN engine for discovery of the service in a NAN cluster, and a plurality of geo-fencing parameters of a geofence;
   process the plurality of geo-fencing parameters from said application on said NAN device;
   discover another NAN device of the NAN cluster during a Discovery Window (DW), the DW is based on a cluster Time synchronization Function (TSF);
   perform geo-fencing with the another NAN device based on said geo-fencing parameters; and
   provide to said application, via the API, one or more indications with respect to said another NAN device, based on the geo-fencing parameters.

2. The apparatus of claim 1, wherein the plurality of geo-fencing parameters comprises a geo-fencing type, the geo-fencing type comprising a value to indicate an internal perimeter geofence, an external perimeter geofence, an external polygonal perimeter geofence, an internal polygonal perimeter geofence, or a pure distance geofence.

3. The apparatus of claim 1, wherein the plurality of geo-fencing parameters comprises an allowed report delay to indicate an allowed delay to report crossing of said geofence.

4. The apparatus of claim 1, wherein the plurality of geo-fencing parameters comprises a minimum measurement rate to indicate a rate of range measurements between said NAN device and said another NAN device.

5. The apparatus of claim 1, wherein the plurality of geo-fencing parameters comprises a geo-fence description of said geofence.

6. The apparatus of claim 1 comprising a NAN media access control (MAC) to communicate one or more NAN messages with said another NAN device.

7. The apparatus of claim 1, wherein said method call comprises a publish method call or a subscribe method call.

8. The apparatus of claim 1 configured to cause the NAN engine to provide to said application at least one indication that said geofence is crossed.

9. The apparatus of claim 1 configured to cause the NAN device to communicate one or more Fine Time Measurement (FTM) messages with said another NAN device, based on the geo-fencing parameters.

10. The apparatus of claim 1 comprising a radio.

11. The apparatus of claim 1 comprising one or more antennas, a memory, and a processor.

12. A product comprising one or more tangible computer-readable non-transitory storage media comprising computer-executable instructions operable to, when executed by at least one computer processor, enable the at least one computer processor to cause a Neighbor Awareness Networking (NAN) engine of a NAN device to:
receive a method call from an application on said NAN device via a NAN Application Protocol Interface (API) between the NAN engine and the application, the method call comprising a service name parameter to identify a service, one or more parameter values to be used by the NAN engine for discovery of the service in a NAN cluster, and a plurality of geo-fencing parameters of a geofence;
process the plurality of geo-fencing parameters from said application on said NAN device;
discover another NAN device of the NAN cluster during a Discovery Window (DW), the DW is based on a cluster Time synchronization Function (TSF);
perform geo-fencing with the another NAN device based on said geo-fencing parameters; and
provide to said application, via the API, one or more indications with respect to said another NAN device, based on the geo-fencing parameters.

13. The product of claim 12, wherein the plurality of geo-fencing parameters comprises a geo-fencing type, the geo-fencing type comprising a value to indicate an internal perimeter geofence, an external perimeter geofence, an external polygonal perimeter geofence, an internal polygonal perimeter geofence, or a pure distance geofence.

14. The product of claim 12, wherein the plurality of geo-fencing parameters comprises an allowed report delay to indicate an allowed delay to report crossing of said geofence.

15. A product comprising one or more tangible computer-readable non-transitory storage media comprising computer-executable instructions operable to, when executed by at least one computer processor, enable the at least one computer processor to cause an application on a Neighbor Awareness Networking (NAN) device to:
provide a method call to a NAN module via a NAN Application Protocol Interface (API) between the NAN module and the application, the method call comprising a service name parameter to identify a service, one or more parameter values to be used by the NAN module for discovery of the service in a NAN cluster, and a plurality of geo-fencing parameters of a geofence; and
process one or more geo-fencing indications received from said NAN module via the NAN API with respect to said geofence, said geo-fencing indications based on said plurality of geo-fencing parameters.

16. The product of claim 15, wherein the plurality of geo-fencing parameters comprises a geo-fencing type, the geo-fencing type comprising a value to indicate an internal perimeter geofence, an external perimeter geofence, an external polygonal perimeter geofence, an internal polygonal perimeter geofence or a pure distance geofence.

17. The product of claim 15, wherein the plurality of geo-fencing parameters comprises an allowed report delay to indicate an allowed delay to report when said geofence is crossed.

18. The product of claim 15, wherein the plurality of geo-fencing parameters comprises a minimum measurement rate to indicate a rate of range measurements between said NAN device and another NAN device crossing said geofence.

19. The product of claim 15, wherein the plurality of geo-fencing parameters comprises a geo-fence description of said geofence.

20. The product of claim 15, wherein said one or more geo-fencing indications comprise an indication that said geofence is crossed.

21. The product of claim 15, wherein said method call comprises a publish method call or a subscribe method call.

* * * * *

UNITED STATES PATENT AND TRADEMARK OFFICE
CERTIFICATE OF CORRECTION

PATENT NO. : 9,723,439 B2
APPLICATION NO. : 14/748286
DATED : August 1, 2017
INVENTOR(S) : Jonathan Segev et al.

It is certified that error appears in the above-identified patent and that said Letters Patent is hereby corrected as shown below:

In the Claims

In Column 29, Line 15, in Claim 12, delete "device via a NAN Application Protocol Interface (API)" and insert -- device, via a NAN Application Protocol Interface (API) --, therefor.

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*